United States Patent
Yagi

(10) Patent No.: US 8,824,425 B2
(45) Date of Patent: Sep. 2, 2014

(54) BASE STATION DEVICE AND COMMUNICATION CONTROL METHOD FOR BASE STATION DEVICE

(75) Inventor: Masahiro Yagi, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 207 days.

(21) Appl. No.: 13/394,791

(22) PCT Filed: Sep. 8, 2010

(86) PCT No.: PCT/JP2010/065401
§ 371 (c)(1),
(2), (4) Date: Mar. 7, 2012

(87) PCT Pub. No.: WO2011/030785
PCT Pub. Date: Mar. 17, 2011

(65) Prior Publication Data
US 2012/0170554 A1 Jul. 5, 2012

(30) Foreign Application Priority Data
Sep. 10, 2009 (JP) .................. 2009-209611

(51) Int. Cl.
*H04J 3/00* (2006.01)

(52) U.S. Cl.
USPC ...................................... 370/336

(58) Field of Classification Search
None
See application file for complete search history.

(56) References Cited

U.S. PATENT DOCUMENTS 8,009,578 B2 * 8/2011 Kishigami et al. ............ 370/252
8,547,986 B2 * 10/2013 Kotecha ........................ 370/432
2006/0203935 A1 * 9/2006 Li et al. ........................ 375/299
2008/0057972 A1 * 3/2008 Doettling et al. ............ 455/450
2009/0225721 A1 * 9/2009 Cudak et al. ................. 370/330
2010/0046445 A1   2/2010 Sawahashi et al.
2010/0067401 A1 * 3/2010 Medvedev et al. ........... 370/253

FOREIGN PATENT DOCUMENTS

| | | |
|---|---|---|
| EP | 2 056 506 A1 | 6/2009 |
| WO | 2008/023646 A1 | 2/2008 |
| WO | 2009/098981 A1 | 8/2009 |

OTHER PUBLICATIONS

Arib; OFDMA/TDMA TDD Broadband Wireless Access System (Next Generation PHS); Arib Standard; Arib STD-T95 Version 1.2; Association of Radio Industries and Businesses; Mar. 18, 2009.
International Search Report; PCT/JP2010/065401; Dec. 14, 2010.
The International Preliminary Report on Patentability and the Written Opinion of the International Searching Authority dated Apr. 19, 2012; International Application No. PCT/JP2010/065401.

\* cited by examiner

*Primary Examiner* — Chi Pham
*Assistant Examiner* — Kouroush Mohebbi
(74) *Attorney, Agent, or Firm* — Studebaker & Brackett PC

(57) ABSTRACT

Provided is a base station device which communicates to/from a mobile station device supporting a MIMO scheme. A base station device (100) includes: a number-of-spatial-streams identification section (126) for identifying the number of spatial streams to be formed between the base station device and a mobile station device (200); a PRU-to-be-allocated identification section (128) for identifying at least part of a plurality of radio channels (PRUs), as a PRU to be allocated for forming the spatial streams whose number is identified by the number-of-spatial-streams identification section (126); and a message generating section (130) for transmitting, to the mobile station device (200), a single piece of control information which includes information indicating the number of the spatial streams, and information indicating the PRU to be allocated.

3 Claims, 4 Drawing Sheets

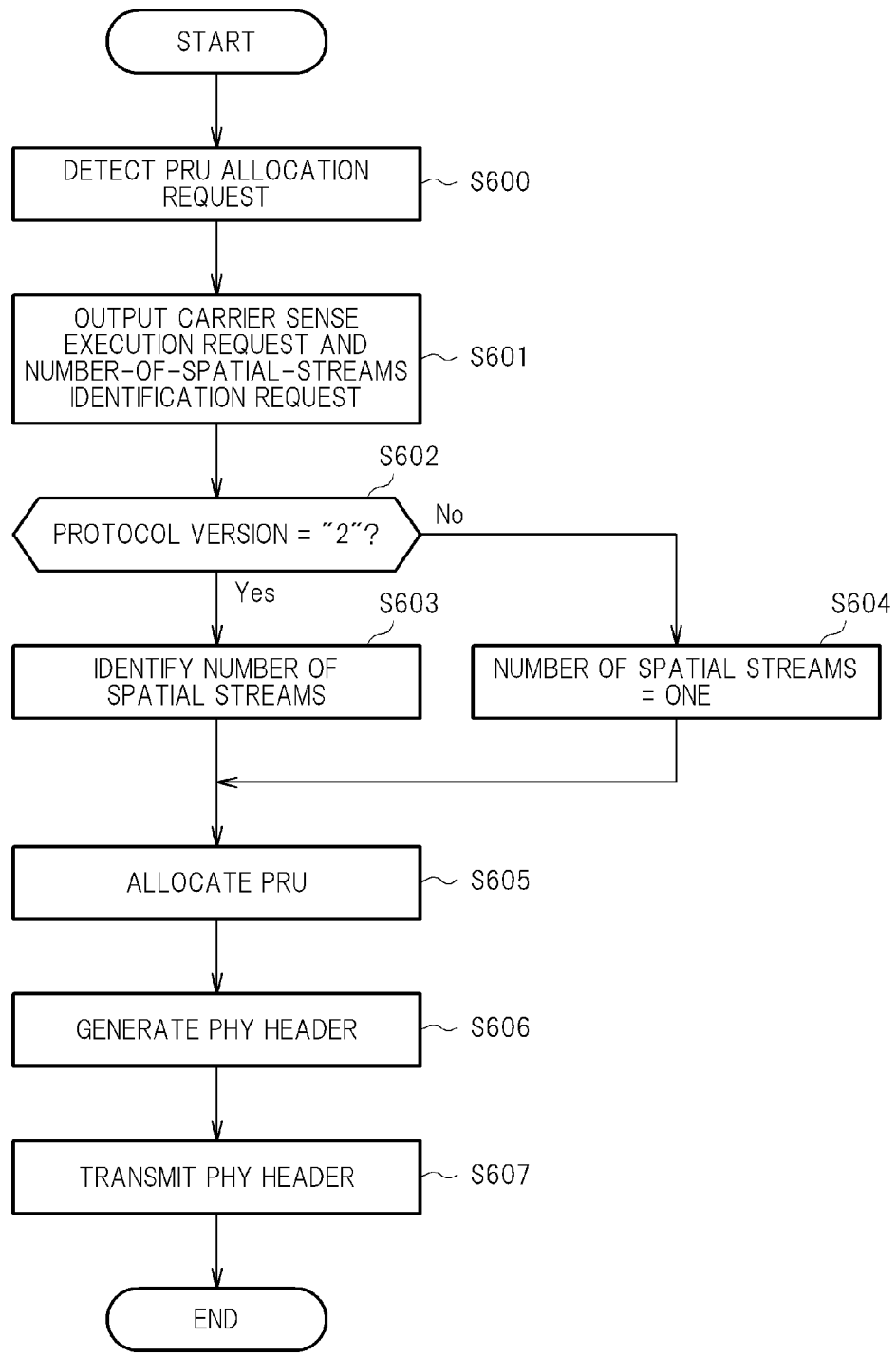

BASE STATION DEVICE AND COMMUNICATION CONTROL METHOD FOR BASE STATION DEVICE

TECHNICAL FIELD

The present invention relates to a base station device and a communication control method for the base station device.

BACKGROUND ART

A base station device in a mobile communication system allocates, based on the communication quality of each radio channel defined by frequencies, time, and the like, part of the radio channels as a communication channel to be used for communication to/from a mobile station device. Then, the base station device notifies the mobile station device of the allocated communication channel. As a standard for such a mobile communication system, for example, Non Patent Literature 1 discloses the next-generation PHS standard.

PRIOR ART DOCUMENT

Non-Patent Document

[NPL 1]: "ARIBSTD-T95 "OFDMA/TDMA TDDBroadband Wireless Access System (Next Generation PHS) ARIB STANDARD"Ver. 1.2, Mar. 18, 2009, The Association of Radio Industries and Businesses

DISCLOSURE OF THE INVENTION

Problems to be Solved by the Invention

At present, a technology of applying the multi-input multi-output (MIMO) scheme including the spatial multiplexing (SM) scheme and the spatial division multiplexing (SDM) scheme to the mobile communication system is being studied. With the communication by the MIMO scheme, spatial streams are formed in a radio space between the base station device and the mobile station device, with the result that a transmission capacity per communication channel can be increased.

In that case, the base station device needs to notify the mobile station device of, in addition to the communication channel to be allocated for the communication, the number of spatial streams to be formed by the communication channel. Therefore, an amount of information of data to be transmitted is increased compared with that of the currently-used information for notifying the communication channel to be allocated for the communication. However, the mobile communication system supporting the next-generation PHS standard or the like does not take measures to keep small an amount of information of data to be transmitted when the base station device notifies the mobile station device of the communication channel to be allocated and the number of spatial streams to be formed by the communication channel.

It is an object of the present invention to provide a base station device which communicates to/from a mobile station device supporting a MIMO scheme and a control method for the base station device, which are capable of keeping small an amount of information for notifying a communication channel to be allocated for communication and the number of spatial streams to be formed by the communication channel.

Means for Solving the Problems

In order to achieve the above-mentioned object, according to the present invention, there is provided a base station device, which communicates to/from a mobile station device supporting a MIMO scheme, including: number-of-spatial-streams identification means for identifying a number of spatial streams to be formed between the base station device and the mobile station device; communication channel identification means for identifying at least part of a plurality of radio channels which are to be used for the communication performed by the base station device, as a communication channel to be used for forming the spatial streams whose number is identified by the number-of-spatial-streams identification means; and control information transmitting means for transmitting, to the mobile station device, a single piece of control information which includes information indicating the number of the spatial streams, which is identified by the number-of-spatial-streams identification means, and information indicating the communication channel identified by the communication channel identification means.

According to the present invention, it is possible to keep small the amount of information for notifying the mobile station device of the communication channel to be allocated for the communication and the number of the spatial streams to be formed by the communication channel.

Further, according to one aspect of the present invention, the base station device further includes maximum-number-of-spatial-streams identification means for identifying, for each of the plurality of radio channels, a maximum number of the spatial streams which can be formed by using the each of the plurality of radio channels, in which, of the plurality of radio channels, the communication channel identification means identifies, as the communication channel, a radio channel whose maximum number of the spatial streams, which is identified by the maximum-number-of-spatial-streams identification means, is equal to or larger than the number of the spatial streams, which is identified by the number-of-spatial-streams identification means.

According to this aspect, the radio channel whose maximum number of the spatial streams is equal to or larger than the number of the spatial streams, which is identified by the number-of-spatial-streams identification means, is identified as the communication channel.

Further, according to one aspect of the present invention: the each of the plurality of radio channels is defined by each of time slots which are obtained by performing time division on a frame defined by time; the maximum-number-of-spatial-streams identification means identifies the maximum number of the spatial streams for the each of the time slots; the communication channel identification means identifies the communication channel for the each of the time slots; and the control information transmitting means transmits, for each frame, the single piece of control information including: information indicating the number of the spatial streams, which is identified by the number-of-spatial-streams identification means for the each of the time slots included in the each frame; and information indicating the communication channel identified by the communication channel identification means for the each of the time slots included in the each frame.

According to this aspect, it is possible to keep small the amount of information for notifying the mobile station device of the number of the spatial streams and the communication channel which are identified for the each of the time slots.

Further, according to the present invention, there is provided a communication control method for a base station device which communicates to/from a mobile station device supporting a MIMO scheme, including: a number-of-spatial-streams identifying step of identifying a number of spatial streams to be formed between the base station device and the mobile station device; a communication channel identifying step of identifying at least part of a plurality of radio channels which are to be used for the communication performed by the base station device, as a communication channel to be used for forming the spatial streams whose number is identified in the number-of-spatial-streams identifying step; and a control information transmitting step of transmitting, to the mobile station device, a single piece of control information which includes information indicating the number of the spatial streams, which is identified in the number-of-spatial-streams identifying step, and information indicating the communication channel identified in the communication channel identifying step.

BRIEF DESCRIPTION OF THE DRAWINGS

FIG. 6 A flowchart illustrating a communication control operation of the base station device according to the embodiment of the present invention.

BEST MODE FOR CARRYING OUT THE INVENTION

Detailed description is given below of a preferred embodiment mode for carrying out the present invention (hereinafter, referred to as embodiment) with reference to the drawings.

Figure 1:
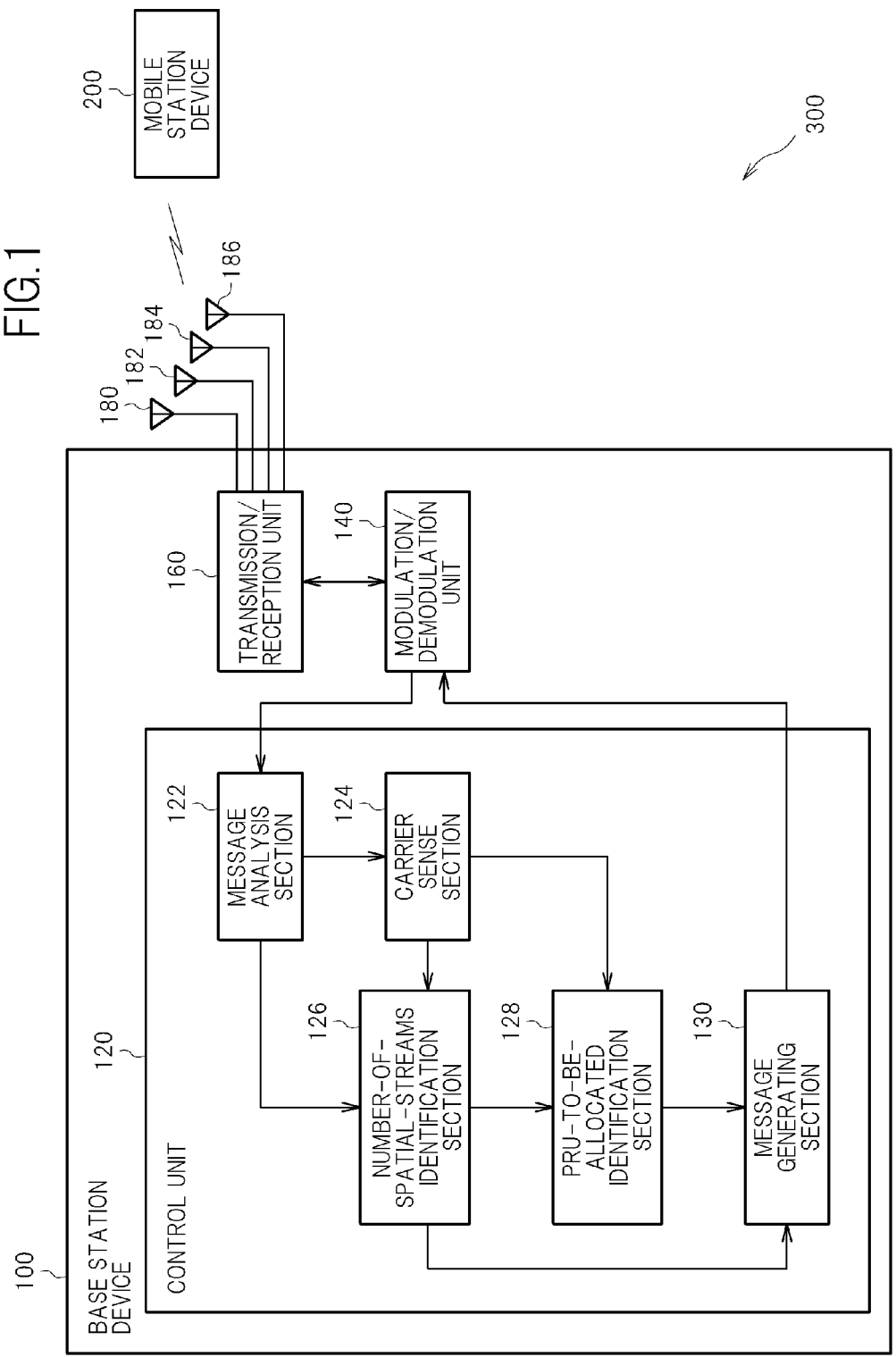
FIG. 1 A diagram illustrating a mobile communication system including a base station device according to an embodiment of the present invention.

FIG. 1 is a diagram illustrating a mobile communication system 300 including a base station device 100 according to this embodiment. The base station device 100 performs communication to/from a mobile station device 200.

The base station device 100 and the mobile station device 200 perform communication with each other in accordance with the orthogonal frequency division multiple access (OFDMA) scheme and the time division multiple access (TDMA) scheme.

Further, in the mobile communication system 300, the base station device 100 can perform communication in accordance with the MIMO scheme including the SM or SDM (hereinafter, referred to as MIMO communication) to/from the mobile station device 200 which supports the MIMO communication. Note that, the base station device 100 does not perform the MIMO communication to/from the mobile station device which does not support the MIMO communication.

The base station device 100 includes a plurality of antennas 180, 182, 184, and 186. The mobile station device 200 includes a plurality of antennas, and supports the MIMO communication. The base station device 100 performs the MIMO communication to/from the mobile station device 200. In the MIMO communication, the device on a transmission side (base station device 100) divides data to be transmitted into a plurality of pieces of divided data, and transmits those pieces of divided data at a time using transmission signals whose number is the same as the number of those pieces of divided data. The device on a reception side (mobile station device 200) receives the pieces of divided data that have been transmitted, and combines those pieces of divided data to generate reception data. In the MIMO communication, the propagation path in which one transmission signal propagates is called a spatial stream, and when the transmission speed in each spatial stream is equal, the maximum value of the transmission speed is expressed as (the transmission speed in one spatial stream)×(the number of spatial streams). Note that, the number of spatial streams that can be formed between the base station device 100 and the mobile station device 200 is any one of one, two, and four.

In this embodiment, it is assumed that the base station device 100 performs the MIMO communication to/from the mobile station device 200 by the spatial multiplexing (SM) scheme. The SM scheme refers to a scheme in which the device on the reception side receives a signal obtained by superimposing a plurality of signals on one another, and extracts a desired signal by separating and combining signals from the received signal, to thereby realize multiplexing of the signals without dividing the space.

Figure 2:
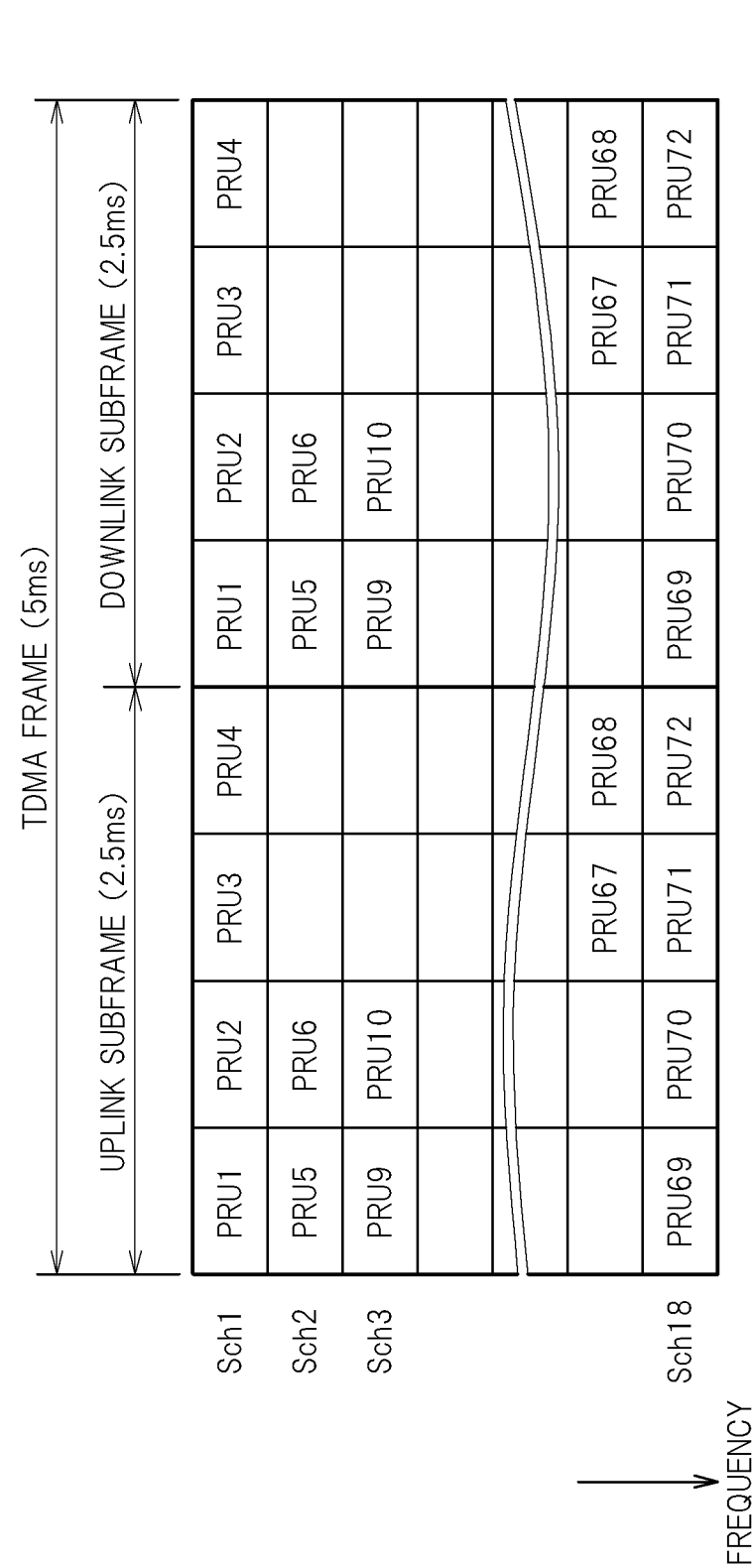
FIG. 2 A diagram illustrating a structure of a radio channel in the mobile communication system including the base station device according to the embodiment of the present invention.

FIG. 2 is a diagram illustrating a structure of a radio channel in the mobile communication system 300 including the base station device 100. In the mobile communication system 300, a TDMA frame having a predetermined duration (5 ms) is sectioned into an uplink subframe (2.5 ms) and a downlink subframe (2.5 ms). Further, as illustrated in FIG. 2, in each of the subframes, a plurality of time slots (here, Sch1 to Sch18) are defined. The minimum unit of a radio channel to be allocated to the mobile station device 200 by the base station device 100 is called a physical resource unit (PRU). Each PRU belongs to any one of the time slots (Slot1 to Slot4) and any one of subchannels (here, Sch1 to Sch18). Then, it is defined that 72 PRUs in total are each identified by a consecutive PRU number starting from one (1, 2, 3, . . . , and 72).

Of those 72 PRUs, four PRUs (PRU1 to PRU4) belonging to a specific subchannel (here, Sch1) are used as common channels (CCHs) to be shared among one or more mobile station devices 200. Meanwhile, the other 68 PRUs (PRU5 to PRU72) are used as individual channels (ICHs) to be allocated individually to each mobile station device 200. The ICHs include, for example, anchor channels (ANCHs), one of which is to be allocated to each mobile station device 200 in principle and used for transmitting control information, and extra channels (EXCHs), one or more of which are to be allocated to each mobile station device 200 as communication channels and used mainly for transmitting communication data. Note that, the base station device 100 can change the PRU (in particular, EXCH) to be allocated to the mobile station device 200 as the ICH every one frame.

The base station device 100 includes a control unit 120, a modulation/demodulation unit 140, a transmission/reception unit 160, and the antennas 180, 182, 184, and 186.

The control unit 120 is implemented as a function of a CPU, and controls an operation of the base station device 100. The control unit 120 includes a message analysis section 122, a carrier sense section 124, a number-of-spatial-streams identification section 126, a PRU-to-be-allocated identification section 128, and a message generating section 130. Further, the control unit 120 identifies the PRU (PRU to be allocated) to be used by the base station device 100 for communicating to/from the mobile station device 200 and the number of spatial streams to be formed by the PRU to be allocated. The control unit 120 then transmits a PHY header indicating the PRU to be allocated and the number of spatial streams via the modulation/demodulation unit 140 and the transmission/reception unit 160. Details of the control unit 120 are described later.

The modulation/demodulation unit 140 is composed of the CPU or the like, and performs processing such as symbol mapping, serial-parallel conversion, inverse discrete Fourier transform, and parallel-serial conversion on the data to be transmitted, which is input from the control unit 120. The modulation/demodulation unit 140 outputs a generated digital signal to the transmission/reception unit 160. Further, the modulation/demodulation unit 140 performs processing such as serial-parallel conversion, discrete Fourier transform, parallel-serial conversion, and decoding processing on a digital signal which is input from the transmission/reception unit 160. The modulation/demodulation unit 140 outputs generated reception data to the control unit 120.

The transmission/reception unit 160 is composed of a semiconductor circuit, and performs processing such as D/A conversion processing, up-conversion processing, and amplification processing on signals input from the modulation/demodulation unit 140. The transmission/reception unit 160 outputs the generated signals to the antennas 180, 182, 184, and 186, respectively. Moreover, the transmission/reception unit 160 performs processing such as amplification processing, down-conversion processing, and A/D conversion processing on signals respectively input from the antennas 180, 182, 184, and 186. The transmission/reception unit 160 outputs the generated signals to the modulation/demodulation unit 140.

The antennas 180, 182, 184, and 186 transmit the signals input from the transmission/reception unit 160 as radio waves, respectively. Further, the antennas 180, 182, 184, and 186 receive radio waves, and then output signals obtained based on the received radio waves to the transmission/reception unit 160, respectively.

Detailed description is given below of an operation of the control unit 120. The message analysis section 122 of the control unit 120 detects, from the reception data input from the modulation/demodulation unit 140, a predetermined signal requesting allocation of the PRU (PRU allocation request). When detecting the PRU allocation request, the message analysis section 122 outputs a carrier sense execution request to the carrier sense section 124 of the control unit 120. Further, the message analysis section 122 outputs a number-of-spatial-streams identification request to the number-of-spatial-streams identification section 126.

The carrier sense section 124 of the control unit 120 receives, as an input, the carrier sense execution request from the message analysis section 122. The carrier sense section 124 detects signal power of a signal which may cause interference for each PRU. The carrier sense section 124 outputs the detection result (carrier sense result) to the number-of-spatial-streams identification section 126 and the PRU-to-be-allocated identification section 128.

The number-of-spatial-streams identification section 126 of the control unit 120 acquires the number-of-spatial-streams identification request from the message analysis section 122 and the carrier sense result from the carrier sense section 124. The number-of-spatial-streams identification section 126 identifies the number of spatial streams to be used for communicating to/from the mobile station device 200 (number of spatial streams) based on the carrier sense result, whether or not the mobile station device 200 supports the MIMO communication, a communication condition (such as SNR and RSSI), a user class and QoS, and a proportional fairness (PF) value.

Specifically, in order to confirm whether or not the mobile station device 200 supports the MIMO communication, the number-of-spatial-streams identification section 126 first judges, based on, for example, a protocol level of the mobile station device 200, whether or not the mobile station device 200 is a device capable of performing the MIMO communication using a plurality of the spatial streams. The protocol level indicates a protocol version to which the mobile station device 200 conforms, and it is assumed that the protocol level is notified from the mobile station device 200 when the communication to/from the mobile station device 200 is started.

It is assumed here that the mobile station device 200 conforms to a protocol version 1 which indicates that the mobile station device 200 does not support the MIMO communication using the plurality of the spatial streams. At this time, the number-of-spatial-streams identification section 126 identifies that the number of spatial streams is one.

On the other hand, it is assumed that the mobile station device 200 conforms to a protocol version 2 which indicates that the mobile station device 200 supports the MIMO communication using the plurality of the spatial streams. At this time, the number-of-spatial-streams identification section 126 identifies, for each PRU, based on the signal quality detected by the carrier sense section 124, the maximum number of spatial streams to be transmitted using the each PRU.

Figures 3, 4, 5:
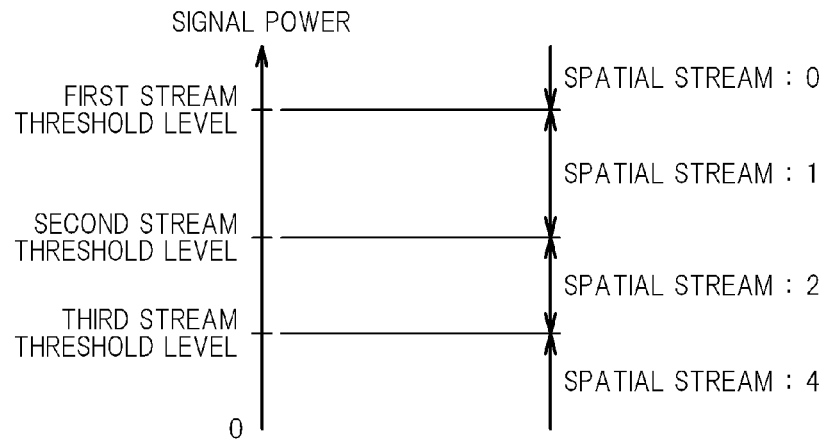
FIG. 3 A diagram illustrating an idea of stream threshold levels according to the embodiment of the present invention.
FIG. 4 A diagram illustrating part of an example of a result obtained by identifying the number of spatial streams for each PRU.
FIG. 5 A diagram illustrating a structure of a PHY header according to the embodiment of the present invention.

As references for identifying the maximum number of spatial streams in the PRU, a first stream threshold level to a fourth stream threshold level are set in advance as parameters. As the signal power of the signal which may cause interference detected in each PRU becomes smaller, the number of spatial streams to be formed in the PRU becomes larger. Note that, each of the first stream threshold level to the third stream threshold level is a value indicating a threshold value of the signal power at which the number of spatial streams to be formed changes. FIG. 3 is a diagram illustrating an idea of the stream threshold levels according to this embodiment. For example, for the PRU whose detected signal power is larger than the third stream threshold level and less than the second stream threshold level, it is judged that a maximum of two spatial streams can be formed. FIG. 4 is a diagram illustrating part of an example of the result obtained by identifying the number of spatial streams (str) for each PRU.

Next, the number-of-spatial-streams identification section 126 identifies, based on the maximum number of spatial streams identified for each PRU, the number of spatial streams to be used for the communication to/from the mobile station device 200. In the base station device 100 which performs the MIMO communication by the SM scheme, the number of spatial streams is the same for all the PRUs to be used for the communication. Specifically, when the number of spatial streams is fixed to a given value, the PRU whose maximum number of spatial streams is larger than the given value is allocated for the communication, and in all the allocated PRUs, the communication using the given number of spatial streams is executed. For example, in a case where the identification result illustrated in FIG. 4 is acquired, any one of the communication using the PRUs 1 to 3 and 5 to 12 with the number of spatial streams being one, the communication using the PRUs 1, 2, 5, 6, 7, 9, 10, and 11 with the number of spatial streams being two, and the communication using the PRUs 5 and 9 with the number of spatial streams being four is executed. Of those, the number-of-spatial-streams identification section 126 determines the number of spatial streams to be formed in the actual communication and the PRUs to be used in the actual communication based on the communication condition (such as SNR and RSSI), the user class, the quality of service (QoS), the proportional fairness (PF) value, and the like. The user class refers to service contents set for the mobile station device 200, and the maximum transmission speed is determined based on the user class. The QoS refers to an allocation method for the PRU in which an order of priority is determined based on the type of data to be transmitted. The PF value refers to a numerical value which indicates a bias of allocation of the PRUs among the plurality of mobile station devices including the mobile station device 200, which perform communication to/from the base station device 100. In view of those, the number-of-spatial-streams identification section 126 identifies the number of spatial streams to be formed in the communication to/from the mobile station device 200, and outputs a signal indicating the identification result to the PRU-to-be-allocated identification section 128 and the message generating section 130.

Based on the carrier sense result acquired by the carrier sense section 124 and the number of spatial streams identified by the number-of-spatial-streams identification section 126, the PRU-to-be-allocated identification section 128 of the control unit 120 identifies at least part of the PRUs as the PRU to be allocated (communication channel) which is to be used for the transmission using the spatial streams whose number (number of spatial streams) is identified by the number-of-spatial-streams identification section 126, and outputs a signal indicating a identification result to the message generating section 130.

The PRU to be allocated is identified from the result of carrier sense and the number of spatial streams in the same manner as in identification of the PRU by the number-of-spatial-streams identification section 126 for each number of spatial streams, which is described above. Specifically, the PRU whose maximum number of spatial streams is equal to or larger than the number of spatial streams identified by the number-of-spatial-streams identification section 126 is identified as the PRU to be allocated.

The message generating section 130 of the control unit 120 generates a PHY header which includes information indicating the number of spatial streams, which is identified by the number-of-spatial-streams identification section 126, and information indicating the PRU to be allocated, which is identified by the PRU-to-be-allocated identification section 128. The message generating section 130 integrates the generated PHY header into data to be transmitted using the ANCH being a control channel and then outputs the resultant to the modulation/demodulation unit 140, to thereby transmit the PHY header to the mobile station device 200. The ANCH is a single control channel transmitted in common to each spatial stream, and the PHY header is a single piece of control information transmitted in common to each spatial stream as well.

FIG. 5 is a diagram illustrating a structure of the PHY header according to this embodiment. In FIG. 5, a value in parentheses indicates a bit count of each piece of data. In the PHY header, "MAP" is a region indicating allocation of each PRU, and "ST" is a region indicating the number of spatial streams. In the "MAP", each bit indicates whether or not one PRU is allocated (allocated: 1, not allocated: 0), and the "MAP" region contains the same number of bits as the number of PRUs. The "ST" contains two bits, and "00" indicates that the number of spatial streams is one, "01" indicates that the number of spatial streams is two, and "10" indicates that the number of spatial streams is four.

The message generating section 130 generates the "MAP" and the "ST" in the PHY header based on the number of spatial streams, which is identified by the number-of-spatial-streams identification section 126, and the PRU to be allocated, which is identified by the PRU-to-be-allocated identification section 128. Then, the message generating section 130 outputs the generated PHY header to the modulation/demodulation unit 140, to thereby transmit the PHY header to the mobile station device 200.

Description is now given of a communication control operation of the base station device 100 with reference to the flowchart. FIG. 6 is a flowchart illustrating the communication control operation of the base station device 100 according to this embodiment.

First, the message analysis section 122 of the base station device 100 detects the PRU allocation request from data received from the mobile station device 200 (S600). The message analysis section 122 outputs the carrier sense execution request to the carrier sense section 124, and outputs the number-of-spatial-streams identification request to the number-of-spatial-streams identification section 126 (S601). The result of carrier sense is to be used in S603 and S605 described later, and hence the carrier sense section 124 executes the carrier sense before those steps.

Next, the number-of-spatial-streams identification section 126 checks whether or not the protocol version of the mobile station device 200 is "2" (S602).

If the protocol version of the mobile station device 200 is "2" in S602, the number-of-spatial-streams identification section 126 identifies the number of spatial streams based on carrier sense processing by the carrier sense section 124 (S603). If the protocol version of the mobile station device 200 is not "2" in S602, the number-of-spatial-streams identification section 126 identifies that the number of spatial streams is one (S604).

Then, the PRU-to-be-allocated identification section 128 allocates the PRU to be used for the communication to/from the mobile station device 200 based on, for example, the number of spatial streams identified by the number-of-spatial-streams identification section 126 and the result of carrier sense processing by the carrier sense section 124 (S605).

Next, the message generating section 130 generates the PHY header which includes the "ST" indicating the number of spatial streams identified by the number-of-spatial-streams identification section 126 and the "MAP" indicating the PRUs identified by the PRU-to-be-allocated identification section 128 (S606).

Then, the message generating section 130 outputs, to the modulation/demodulation unit 140, the data to be transmitted using the ANCH which includes the PHY header generated in S606, to thereby transmit the PHY header to the mobile station device 200 (S607). With this, the communication control operation of the base station device 100 is terminated.

With this configuration, in the base station device which communicates to/from the mobile station device supporting the MIMO scheme, an amount of information for notifying a communication channel to be allocated for the communication and the number of spatial streams to be formed by the communication channel is kept smaller than that in a case of notifying the communication channel for each spatial stream.

Note that, in the embodiment described above, the base station device 100 which performs the MIMO communication by the SM scheme is taken as an example, but the present invention is not limited thereto. The present invention is also applicable to, for example, the base station device which performs the MIMO communication by the SDMA scheme.

Further, in the above description of the embodiment, the PRU-to-be-allocated identification section 128 identifies the PRU to be allocated based on the result of carrier sense by the carrier sense section 124 and the number of spatial streams identified by the number-of-spatial-streams identification section 126, but the present invention is not limited thereto. The PRU to be allocated may be identified by using the user class or QoS.

Further, in the above description of the embodiment, the communication channel (PRU) is determined based on, for example, the result of carrier sense, but the present invention is not limited thereto. The present invention is also applicable to other configurations as long as the number of spatial streams is the same for all the PRUs to be used for the communication.

Further, in the above description of the embodiment, the number of spatial streams is identified for each frame, but the present invention is not limited thereto. For example, the number of spatial streams may be identified for each time slot, which is defined by further dividing the frame and corresponds to one PRU. In that case, STs, each of which is provided in one PHY header illustrated in FIG. 5, are provided by the same number as that of time slots. In this case, the message generating section 130 transmits the PHY which includes information indicating the number of spatial streams identified for each time slot contained in the frame corresponding to the PHY header and information indicating the PRUs to be allocated, which is identified for each time slot.

Further, in the above description of the embodiment, the PHY header having the same format is generated regardless of the number of spatial streams, but the present invention is not limited thereto. In a case where there are a plurality of spatial streams, the PHY header having the format described above in the embodiment may be generated, and in a case where there is a single spatial stream, the PHY header containing only the MAP (not containing the "ST") may be generated.

The invention claimed is:

1. A base station device, which communicates to/from a mobile station device supporting a MIMO scheme, comprising:
   number-of-spatial-streams identification means for identifying a number of spatial streams to be formed between the base station device and the mobile station device;
   communication channel identification means for identifying at least part of a plurality of radio channels which are to be used for the communication performed by the base station device, as a communication channel to be used for forming the spatial streams whose number is identified by the number-of-spatial-streams identification means;
   control information transmitting means for transmitting, to the mobile station device, a single piece of control information which includes information indicating the number of the spatial streams, which is identified by the number-of-spatial-streams identification means, and information indicating the communication channel identified by the communication channel identification means;
   maximum-number-of-spatial-streams identification means for identifying, for each of the plurality of radio channels, a maximum number of the spatial streams which can be formed by using the each of the plurality of radio channels,
   wherein, of the plurality of radio channels, the communication channel identification means identifies, as the communication channel, a radio channel whose maximum number of the spatial streams, which is identified by the maximum-number-of-spatial-streams identification means, is equal to or larger than the number of the spatial streams, which is identified by the number-of-spatial-streams identification means.

2. The base station device according to claim 1,
   wherein the each of the plurality of radio channels is defined by each of time slots which are obtained by performing time division on a frame defined by time,
   wherein the maximum-number-of-spatial-streams identification means identifies the maximum number of the spatial streams for the each of the time slots,
   wherein the communication channel identification means identifies the communication channel for the each of the time slots, and
   wherein the control information transmitting means transmits, for each frame, the single piece of control information including:
      information indicating the number of the spatial streams, which is identified by the number-of-spatial-streams identification means for the each of the time slots included in the each frame; and
      information indicating the communication channel identified by the communication channel identification means for the each of the time slots included in the each frame.

3. A communication control method for a base station device which communicates to/from a mobile station device supporting a MIMO scheme, comprising:
   a number-of-spatial-streams identifying step of identifying a number of spatial streams to be formed between the base station device and the mobile station device;
   a communication channel identifying step of identifying at least part of a plurality of radio channels which are to be used for the communication performed by the base station device, as a communication channel to be used for forming the spatial streams whose number is identified in the number-of-spatial-streams identifying step;
   a control information transmitting step of transmitting, to the mobile station device, a single piece of control information which includes information indicating the number of the spatial streams, which is identified in the number-of-spatial-streams identifying step, and information indicating the communication channel identified in the communication channel identifying step; and
   a maximum-number-of-spatial-streams identification step for identifying, for each of the plurality of radio channels, a maximum number of the spatial streams which can be formed by using the each of the plurality of radio channels,
   wherein, of the plurality of radio channels, the communication channel identifying step includes identifying, as the communication channel, a radio channel whose maximum number of the spatial streams, which is identified in the maximum-number-of-spatial-streams identification step, is equal to or larger than the number of the spatial streams, which is identified by the number-of-spatial-streams identifying step.

* * * * *